(12) United States Patent
Hashimoto et al.

(10) Patent No.: US 7,884,578 B2
(45) Date of Patent: Feb. 8, 2011

(54) BATTERY CHARGING CIRCUIT WITH BACKFLOW PREVENTION TRANSISTOR, PORTABLE ELECTRONIC DEVICE AND SEMICONDUCTOR INTEGRATED CIRCUIT WITH BACKFLOW PREVENTION TRANSISTOR

(75) Inventors: Tetsuro Hashimoto, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 834 days.

(21) Appl. No.: 11/804,075

(22) Filed: May 17, 2007

(65) Prior Publication Data

US 2007/0296377 A1    Dec. 27, 2007

(30) Foreign Application Priority Data

May 17, 2006   (JP)   ............................. P2006-137835

(51) Int. Cl.
*H02J 7/06* (2006.01)
*H02J 7/24* (2006.01)

(52) U.S. Cl. ..................... 320/159; 320/133; 320/155

(58) Field of Classification Search .................. 320/133, 320/155, 159, 165
See application file for complete search history.

(56) References Cited

U.S. PATENT DOCUMENTS

| | | | |
|---|---|---|---|
| 6,297,619 B1 * | 10/2001 | Terada | ......................... 320/134 |
| 6,316,925 B1 * | 11/2001 | Canter | ......................... 323/282 |
| 6,798,174 B2 * | 9/2004 | Cornett et al. | .............. 320/155 |
| 2001/0020802 A1 * | 9/2001 | Kitagawa et al. | .............. 307/66 |
| 2005/0024019 A1 * | 2/2005 | Matsumoto et al. | ......... 320/132 |

FOREIGN PATENT DOCUMENTS

JP    2001-119867    4/2001

* cited by examiner

*Primary Examiner*—Edward Tso
*Assistant Examiner*—Arun Williams
(74) *Attorney, Agent, or Firm*—Cantor Colburn LLP

(57) ABSTRACT

A battery charging circuit is used by being connected to a direct-current power source. The battery charging circuit includes a control transistor, a backflow prevention transistor and a charging controller. The control transistor is disposed in a charging path between the direct-current power source and a battery, and is configured to control a direct-current voltage from the direct-current power source, and to output controlled direct-current voltage as a charging voltage. The backflow prevention transistor is disposed in the charging path, and is configured to output the charging voltage to the battery, and to be turned off when an electric current flows backward from the battery to the direct-current power source. The charging controller is configured to turn on the backflow prevention transistor when charging of the battery starts, and to turn on the control transistor after a fixed period of time elapses from a start of the charging.

2 Claims, 5 Drawing Sheets

BATTERY CHARGING CIRCUIT WITH BACKFLOW PREVENTION TRANSISTOR, PORTABLE ELECTRONIC DEVICE AND SEMICONDUCTOR INTEGRATED CIRCUIT WITH BACKFLOW PREVENTION TRANSISTOR

CROSS REFERENCE TO RELATED APPLICATION

This application is based upon and claims the benefit of priority from prior Japanese Patent Application P2006-137835 filed on May 17, 2006; the entire contents of which are incorporated by reference herein.

BACKGROUND OF THE INVENTION

1. Field of the Invention

The present invention relates to a battery charging circuit, a portable electronic device and a semiconductor integrated circuit, which are capable of charging a battery.

2. Description of the Related Art

In portable electronic devices such as cellular telephones, personal handyphone system (PHS) terminals, personal digital assistances (PDAs) and personal computers (PCs), secondary batteries such as chargeable lithium batteries having excellent discharge characteristics are frequently used.

A battery charging circuit for charging a battery having a charging ON/OFF circuit and a backflow prevention circuit has been proposed (For example, refer to Japanese Patent Application Laid-open Publication No. 2001-119867). The charging ON/OFF circuit supplies power from a power source to the battery. The backflow prevention circuit prevents a battery from being discharged. Here, the backflow prevention circuit is connected between the charging ON/OFF circuit and the battery.

However, in case where an element having a parasitic diode such as a p-channel MOS transistor (hereinafter referred to as "pMOS transistor") is used as the backflow prevention means, a voltage applied to the battery may be increased by the parasitic diode. Therefore, a voltage exceeding a rated value may be applied to a battery when the voltage of the battery becomes close to the full-charge voltage. When a voltage exceeding a rated value is applied to a lithium battery or the like, which is currently mainstream, the battery may ignite in the worst case.

SUMMARY OF THE INVENTION

In view of the above-described problems, an object of the present invention is to provide a battery charging circuit, a portable electronic device and a semiconductor integrated circuit which are capable of preventing a voltage exceeding a rated value from being applied to a battery when the voltage of the battery is close to the full-charge voltage.

To achieve the above-described object, a first aspect of the present invention is summarized as a battery charging circuit used by being connected to a direct-current power source. The battery charging circuit includes a control transistor, a backflow prevention transistor and a charging controller. Here, the control transistor is disposed in a charging path between the direct-current power source and a battery. The control transistor is configured to control a direct-current voltage from the direct-current power source, and to output controlled direct-current voltage as a charging voltage. The backflow prevention transistor is disposed in the charging path. The backflow prevention transistor is configured to output the charging voltage to the battery, and to be turned off when an electric current flows backward from the battery to the direct-current power source. The charging controller is configured to turn on the backflow prevention transistor when charging of the battery starts, and to turn on the control transistor after a fixed period of time elapses from a start of the charging.

A second aspect of the present invention is summarized as the battery charging circuit according to the first aspect, further including a first controller and a second controller. The first controller is configured to detect a voltage of the battery, and to control a conductivity degree of the control transistor so that the voltage of the battery would be a predetermined value or less. The second controller is configured to detect a direction in which an electric current flows in the charging path, to turn on the backflow prevention transistor when an electric current flows from the direct-current power source to the battery, and to turn off the backflow prevention transistor when an electric current flows from the battery to the direct-current power source.

A third aspect of the present invention is summarized as the battery charging circuit according to the first aspect, in which the charging controller permits the second controller to turn off the backflow prevention transistor after a fixed period of time elapses from the start of the charging.

A fourth aspect of the present invention is summarized as a portable electronic device which includes a chargeable battery and a battery charging circuit according to the first aspect.

A fifth aspect of the present invention is summarized as a portable electronic device which includes a chargeable battery and a battery charging circuit according to the second aspect.

A sixth aspect of the present invention is summarized as a portable electronic device which includes a chargeable battery and a battery charging circuit according to the third aspect.

A seventh aspect of the present invention is summarized as a semiconductor integrated circuit used by being connected to a direct-current power source, a battery and a control transistor. Here, the control transistor is disposed in a charging path between the direct-current power source and a battery. The control transistor is configured to control a direct-current voltage from the direct-current power source, and to output controlled direct-current voltage as a charging voltage. The semiconductor integrated circuit includes a backflow prevention transistor and a charging controller. The backflow prevention transistor is disposed in the charging path. The backflow prevention transistor is configured to output the charging voltage to the battery, and to be turned off when an electric current flows backward from the battery to the direct-current power source. The charging controller is configured to turn on the backflow prevention transistor when charging of the battery starts, and to turn on the control transistor after a fixed period of time elapses from a start of the charging.

According to the present invention, it is possible to provide a battery charging circuit, a portable electronic device and a semiconductor integrated circuit, which are capable of preventing a voltage exceeding a rated value from being applied to a battery when the voltage of the battery is close to a full-charge voltage.

DETAILED DESCRIPTION OF THE INVENTION

Figure 1:
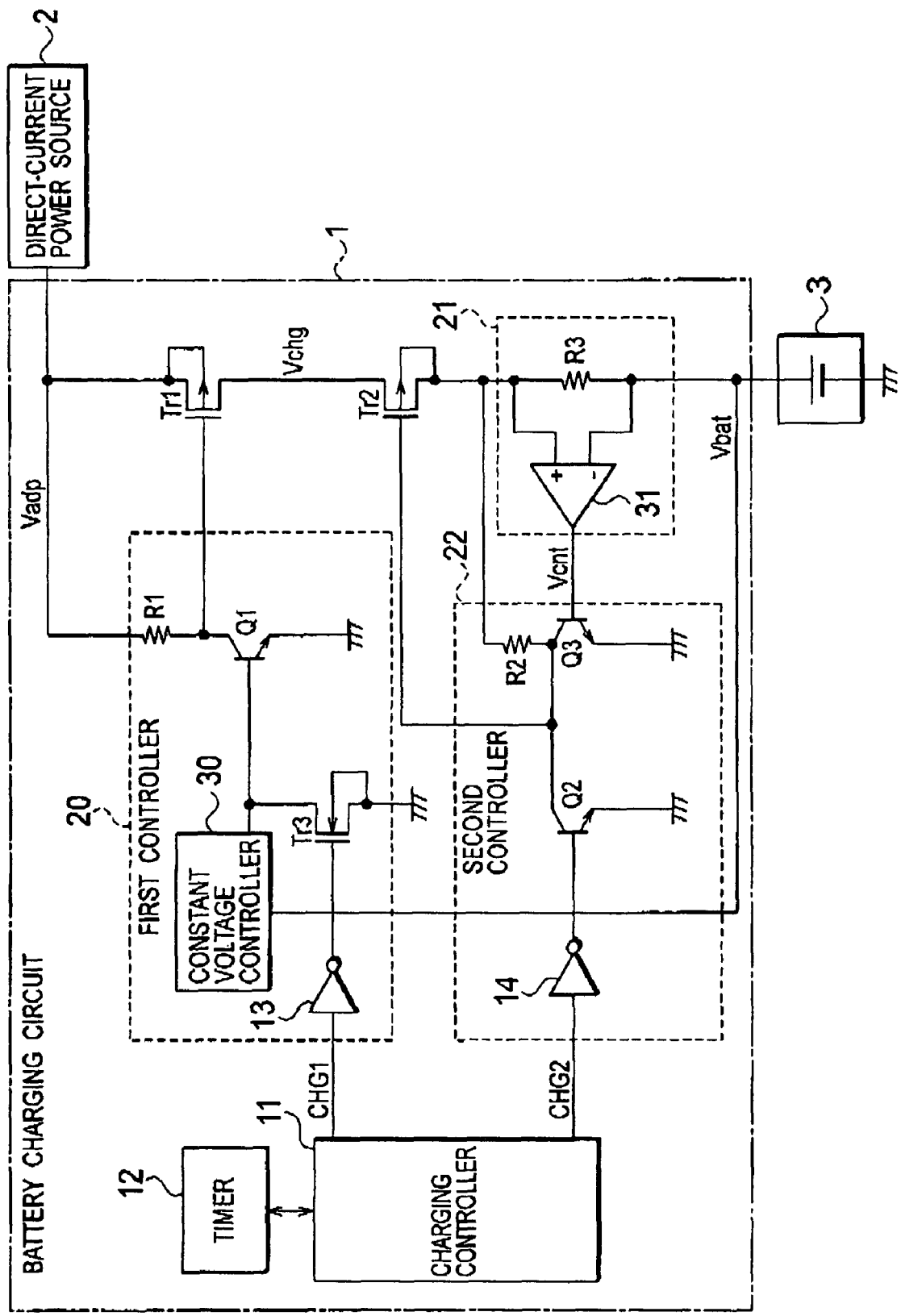
FIG. 1 is a circuit block diagram showing a configuration example of a battery charging circuit according to an embodiment of the present invention.

Next, an embodiment of the present invention is described with reference to the accompanying drawings. Throughout the drawings, the same or similar reference numerals and symbols are used to designate the same or similar parts.

(Battery Charging Circuit)

As shown in FIG. 1, a battery charging circuit 1 according to an embodiment of the present invention is used while the battery charging circuit 1 is connected to a direct-current power source 2 and to a chargeable battery 3. The direct-current power source 2 is an AC adapter, for example. The direct-current power source 2 converts alternating-current power supplied from an unillustrated commercially-available alternator. The direct-current power source 2 outputs the converted power as a direct-current voltage Vadp which is about 5.5 V. As the battery 3, a lithium battery or the like which is chargeable can be used.

First, a schematic configuration of the battery charging circuit 1 is described. The battery charging circuit 1 includes a control transistor Tr1, a backflow prevention transistor Tr2, a direction detector 21, a first controller 20, a second controller 22, a charging controller 11 and a timer 12.

pMOS transistors are used as each of the control transistor Tr1 and the backflow prevention transistor Tr2. The control transistor Tr1 is disposed in a charging path leading from the direct-current power source 2 to the battery 3. The direct-current voltage Vadp from the direct-current power source 2 is controlled so that the voltage (hereinafter referred to as a "battery voltage") of the battery 3 would be a predetermined value, e.g., 4.2 V or less. The thus controlled voltage Vadp is outputted as a charging voltage Vchg.

The backflow prevention transistor Tr2 is disposed in a charging path leading from the direct-current power source 2 to the battery 3. The backflow prevention transistor Tr2 outputs a charging voltage Vchg to the battery 3, and is turned off when an electric current flows backward from the battery 3 toward the direct-current power source 2.

The first controller 20 detects a battery voltage Vbat, and controls the conductivity degree of the control transistor Tr1 so that the battery voltage Vbat is, for example, 4.2 V or less. The direction detector 21 detects a direction in which an electric current flows in the charging path. The second controller 22 turns off the backflow prevention transistor Tr2 when the direction detector 21 detects a backflow of an electric current.

The charging controller 11 turns on the backflow prevention transistor Tr2 at the time when the charging of the battery 3 starts. The charging controller 11 turns on the control transistor Tr1 when a fixed period of time elapses after the backflow prevention transistor Tr2 is turned on. The charging controller 11 controls the timer 12. The timer 12 measures an elapsed time from the backflow prevention transistor Tr2 is forced to be turned on (hereinafter referred to as "forcibly turned ON"). Incidentally, as the timer 12, a counter which counts clock signals supplied from an external circuit can be used.

A configuration of the battery charging circuit 1 is described below in detail.

In the control transistor Tr1, a source is connected to the direct-current power source 2, and a back gate and the source are connected to each other. In the backflow prevention transistor Tr2, a source is connected to the control transistor Tr1, and a back gate and the drain are connected to each other.

A parasitic diode is formed by a pn-junction between a p-type semiconductor region, which constitutes the backflow prevention transistor Tr2, and an n-type semiconductor region, which constitute the back gate. Accordingly, when the battery voltage Vbat is close to a full-charge voltage, the charging voltage Vchg is raised by about 0.7 V.

However, as described above, by turning on the backflow prevention transistor Tr2 at the time when the charging of the battery 3 starts, and then by turning on the control transistor Tr1 when a fixed period of time elapses after the stare of the charging, the parasitic diode is made inoperative. Therefore, the charging voltage Vchg is prevented from being raised by about 0.7 V.

Subsequently, the first controller 20 is described in detail. The first controller 20 includes a constant voltage controller 30, an inverter 13, an n-channel MOS transistor (hereinafter referred to a "nMOS transistor") Tr3, an npn bipolar transistor (hereinafter referred to as "npn transistor") Q1 and a resistance R1.

The inverter 13 is connected between an output of the charging controller 11 and a gate of the nMOS transistor Tr3. An input of the constant voltage controller 30 is connected to one end of the battery 3. In the nMOS transistor, a source is grounded, and a back gate and a drain are connected to each other. One end of the resistance R1 is connected to the direct-current power source 2. In the npn transistor Q1, a collector is connected to the other end of the resistance R1; a base is connected to the drain of the nMOS transistor Tr3 and to an output of the constant voltage controller 30; and an emitter is grounded. The gate of the control transistor Tr1 is connected to a connection node for connecting the collector of the npn transistor Q1 to the resistance R1.

Accordingly, in accordance with the conductivity degree of the npn transistor Q1, an electric current flowing into the resistance R1 is controlled, and thereby a gate voltage of the control transistor Tr1 is controlled. The constant voltage controller 30 detects the battery voltage Vbat, and then controls the degree of conductivity of the npn transistor Q1 so that the battery voltage Vbat would be a predetermined value (for example, 4.2 V).

The inverter 13 inverts a first control signal CHG1 obtained from the charging controller 11. The first control signal CHG1 is used to turn on the control transistor Tr1 at the time of charging.

The nMOS transistor Tr3 is turned on in response to an output signal of the inverter 13. Specifically, when an output signal of the inverter 13 is at a high level, the nMOS transistor Tr3 is turned on. When the signal is at a low level, the nMOS transistor Tr3 is turned off.

Furthermore, when the nMOS transistor Tr3 is turned on, the npn transistor Q1 is turned off, and the conductivity degree of the npn transistor Q1 is controlled by the constant voltage controller 30.

When the npn transistor Q1 is an off-state, a voltage of a high level is applied to the gate of the control transistor Tr1 via the resistance R1, and thereby the control transistor Tr1 is turned off. When the npn transistor Q1 is an off-state, a voltage in accordance with the conductivity degree of the npn transistor Q1 is applied to the gate of the control transistor Tr1.

Consequently, when the first control signal CHG1 is at a low level, the control transistor Tr1 is an off-state. When the first control signal CHG1 is at a high level, the control transistor Tr1 is controlled by the constant voltage controller 30.

Next, a configuration of the direction detector 21 is described in detail. The direction detector 21 includes an electric-current detection resistance R3 and a comparator 31. The electric-current detection resistance R3 is connected between the drain of the backflow prevention transistor Tr2 and one end of the battery 3. A non-inverting input (+) of the comparator 31 is connected to one end of the electric-current detection resistance R3, and an inverting input (−) thereof is connected to the other end of the electric-current detection resistance R3.

When an electric current flows forward in the charging path, i.e., flows in a direction from the direct-current power source 2 to the battery 3, an electric potential of the non-inverting input (+) is higher than that of the inverting input (−) due to a voltage drop occurring in the electric-current detection resistance R3. As a result, when an electric current flows forward in the charging path, an output signal Vcnt of the comparator 31 is a high level.

On the other hand, when an electric current flows backward in the charging path, i.e., flows in a direction from the battery 3 to the direct-current power source 2, a potential of the inverting input (−) is higher than that of the non-inverting input (+) due to a voltage drop occurring in the electric-current detection resistance R3. As a result, when an electric current flows backward in the charging path, the output signal Vcnt of the comparator 31 is a low level.

Next, a configuration of the second controller 22 is described in detail. The second controller 22 includes an inverter 14, an npn transistor Q2, a resistance R2 and an npn transistor Q3.

The inverter 14 is connected between an output of the charging controller 11 and a base of the npn transistor Q2. In the npn transistor Q2, a collector is connected to a gate of the backflow prevention transistor Tr2, and an emitter is grounded. One end of the resistance R2 is connected to the drain of the backflow prevention transistor Tr2. In the npn transistor Q3, a collector is connected to the other end of the resistance R2; a base is connected to an output of the comparator 31; and an emitter is grounded. The collectors of the respective npn transistors Q2 and Q3 are connected to each other, and are also connected to the gate of the backflow prevention transistor Tr2.

The inverter 14 inverts a second control signal CHG2 obtained from the charging controller 11. The second control signal CHG2 is used to cause the backflow prevention transistor Tr2 to be forcibly turned ON at the time when charging starts.

The npn transistor Q2 is turned on in response to an output signal of the inverter 14. Specifically, when the output signal of the inverter 14 is at a high level, the npn transistor Q2 is turned on. When the output of the inverter 14 is at a low level, the npn transistor Q2 is turned off.

When the npn transistor Q2 is an on-state, a gate voltage of the backflow prevention transistor Tr2 becomes low, and thereby the backflow prevention transistor Tr2 is turned on. On the other hand, when the output signal of the inverter 14 is at a low level, the npn transistor Q2 is turned off. For this reason, the backflow prevention transistor Tr2 is controlled by the resistance R2 and by the npn transistor Q3.

The npn transistor Q3 is turned on when the output signal Vcnt of the comparator 31 is at a high level, and the gate voltage of the backflow prevention transistor Tr2 is set at a low level. Consequently, the backflow prevention transistor Tr2 is turned on.

When the output signal Vcnt of the comparator 31 is at a low level, i.e., when a backflow from the battery 3 occurs, the npn transistor Q3 is turned off, and a voltage of a high level is applied from the resistance R2 to the gate of the backflow prevention transistor Tr2. As a result, the backflow prevention transistor Tr2 is turned off.

Example of Control Flow of Charging Controller

Figure 2:
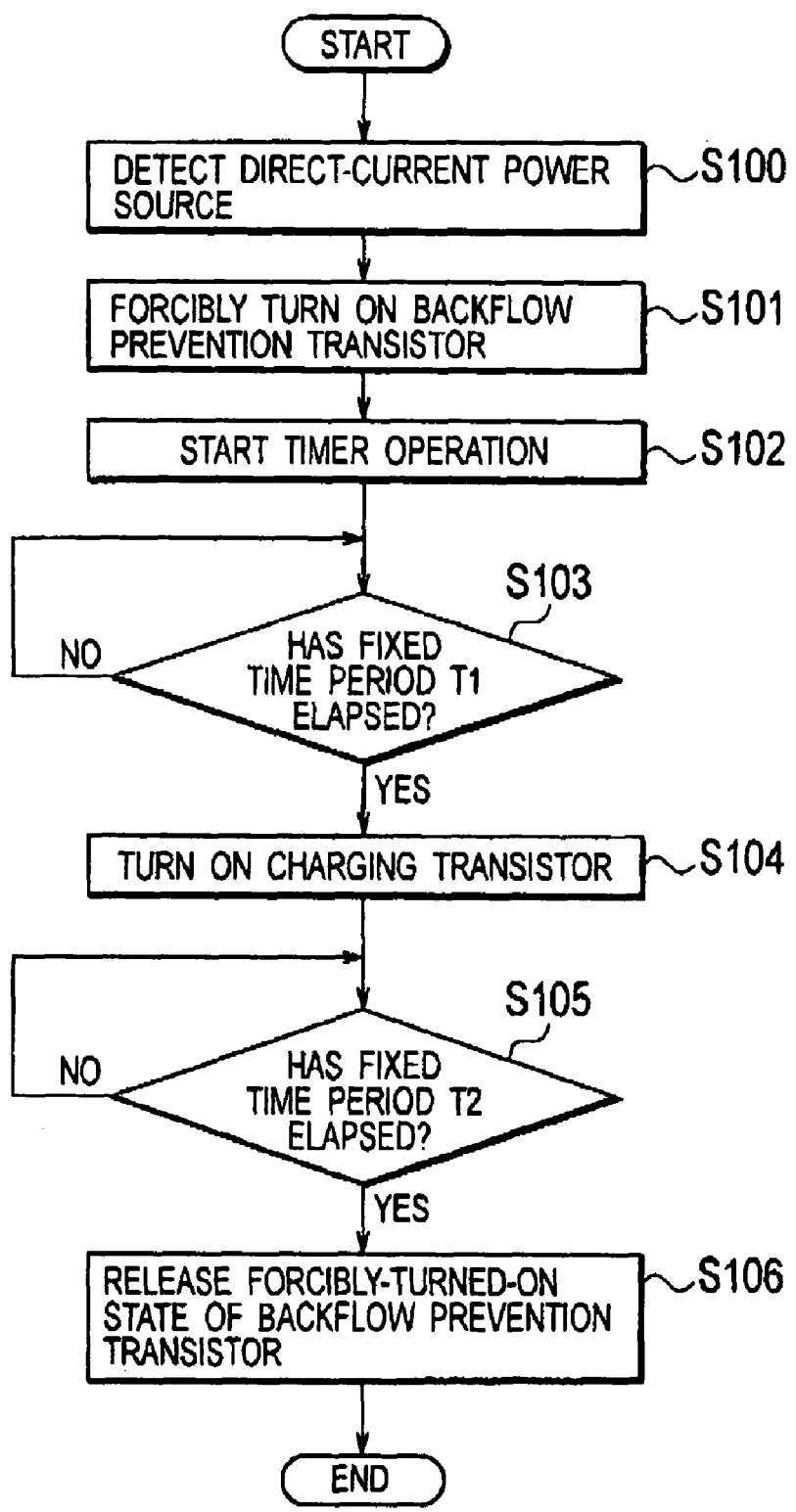
FIG. 2 is a flowchart showing a control flow of the charging controller according to an embodiment of the present invention.

Next, the charging controller 11 is described in detail. The charging controller 11 controls a charging operation in a sequence as shown in FIG. 2.

In step S100, the charging controller 11 detects a state in which the direct-current power source 2 is connected to the battery charging circuit 1. The state in which the direct-current power source 2 is connected to the battery charging circuit 1 is informed by, for example, an external CPU (not shown) of the battery charging circuit 1.

In step S101, the charging controller 11 causes the backflow prevention transistor Tr2 to be forcibly turned ON by using the second control signal CHG2.

In step S102, the charging controller 11 causes the timer 12 to measure time elapsed from a point in time at which the backflow prevention transistor Tr2 is forcibly turned ON.

In step 103, the charging controller 11 is in a wait state until the timer 12 measures a fixed time period T1. When the timer 12 measures the certain time period T1, the process goes to Step S104.

In step S104, the charging controller 11 turns on the control transistor Tr1 by using the first control signal CHG1.

In step S105, the charging controller 11 is in a wait state until the timer 12 measures a fixed time period T2. When the timer 12 measures the fixed time period T2, the process goes to Step S106.

In step S106, the charging controller 11 releases the forcibly-turned-ON state of the backflow prevention transistor Tr2 by using the second control signal CHG2.

Example of Charging Operation of Battery Charging Circuit

Figure 3:
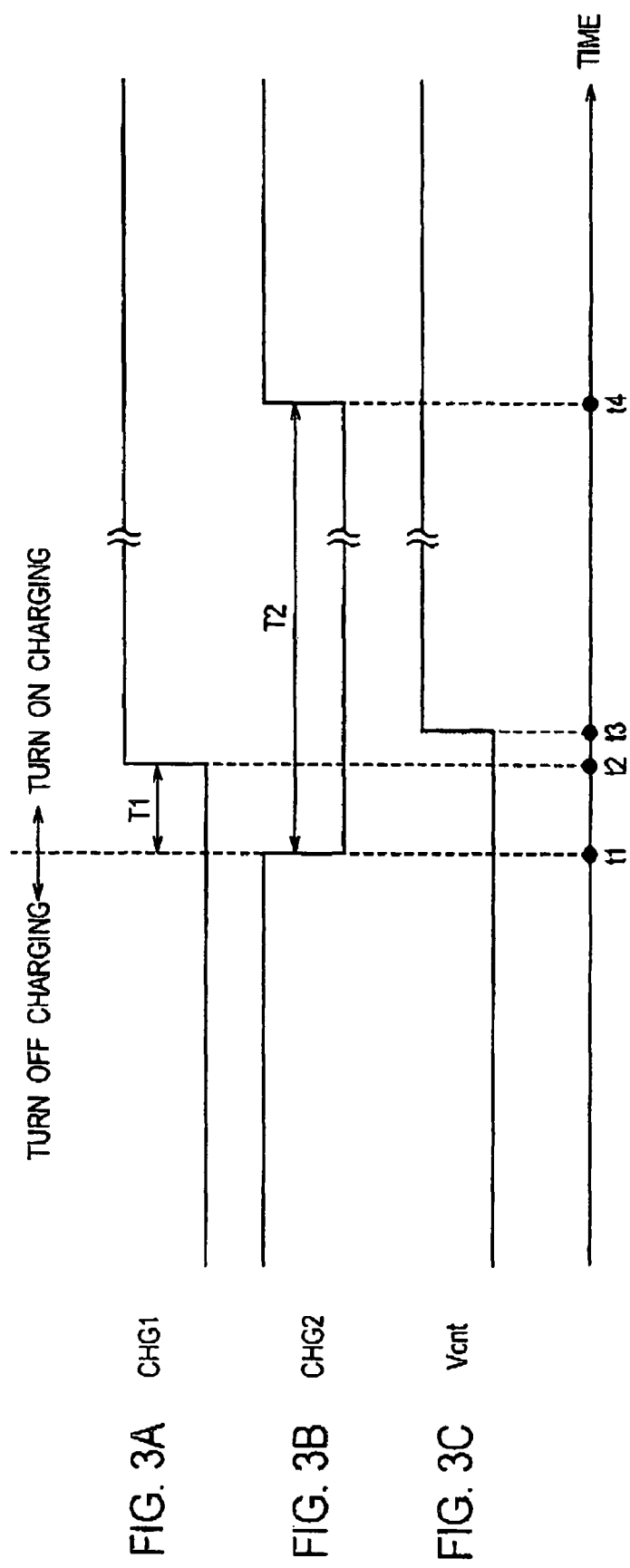
FIGS. 3A to 3C are timing charts respectively showing examples of operations of the battery charging circuit according to an embodiment of the present invention.

Next, referring to a timing chart shown in FIG. 3, detailed descriptions will bee provided for an operation of the battery charging circuit 1 at the time when charging starts.

The direct-current power source 2 is connected to the battery charging circuit 1 at a time t1, and thereby charging to the battery 3 starts. When detecting a state in which the direct-current power source 2 is connected, the controller drops the level of the second control signal CHG2 from a high level to a low level as shown in FIG. 3B. As a result, the backflow prevention transistor Tr2 is brought into conduction.

At a time t2 which is time after the certain time T1 elapses from the time t1, the charging controller 11 raises the level of the first control signal CHG1 from a low level to a high level as shown in FIG. 3A. When the first control signal CHG1 is raised to a high level, the control transistor Tr1 is brought into conduction. When the control transistor Tr1 is turned on, the direct-current voltage Vadp is applied to the electric-current detection resistance R3 via the control transistor Tr1 and the backflow prevention transistor Tr2.

Consequently, an electric current is supplied from the electric-current detection resistance R3 to the battery 3, and the output signal Vcnt of the comparator 31 is raised to a high level at a time t3 as shown in FIG. 3C.

At a time t4 which is a time after the fixed time T1 elapses from the time t1, the charging controller 11 raises the second control signal CHG2 from a low level to a high level. As a result, since the forcibly-turned-ON state of the backflow prevention transistor Tr2 is released, the second controller 22 can turn off the backflow prevention transistor Tr2 conduction at the time when a backflow occurs.

As described above in detail, the embodiment of the present invention makes it possible to cause the parasitic diode of the backflow prevention transistor Tr2 to be inoperative by turning on the backflow prevention transistor Tr2 before turning on the control transistor Tr1 at the time when the charging of the battery 3 starts. Thus, when the battery voltage Vbat is already close to a full-charge voltage at the time when the charging of the battery starts, a voltage exceeding a rate value can be prevented from being applied to the battery 3.

(Portable Electronic Device)

Figure 4:
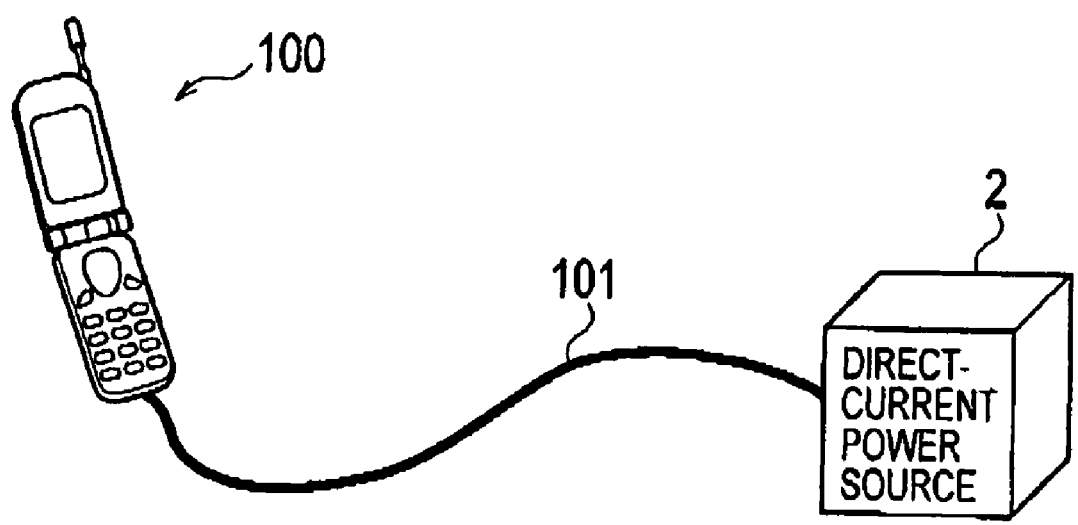
FIG. 4 is a schematic view showing a configuration example of a portable electronic device according to an embodiment of the present invention.

The above-described battery charging circuit 1 and the battery 3 can be mounted on a portable electronic device 100 as shown in FIG. 4.

Incidentally, although a cellular telephone or a PHS terminal is exemplified as the portable electronic device, the device may be a PDA, a laptop PC, a portable music player, a portable video game player or the like.

(Semiconductor Integrated Circuit)

Figure 5:
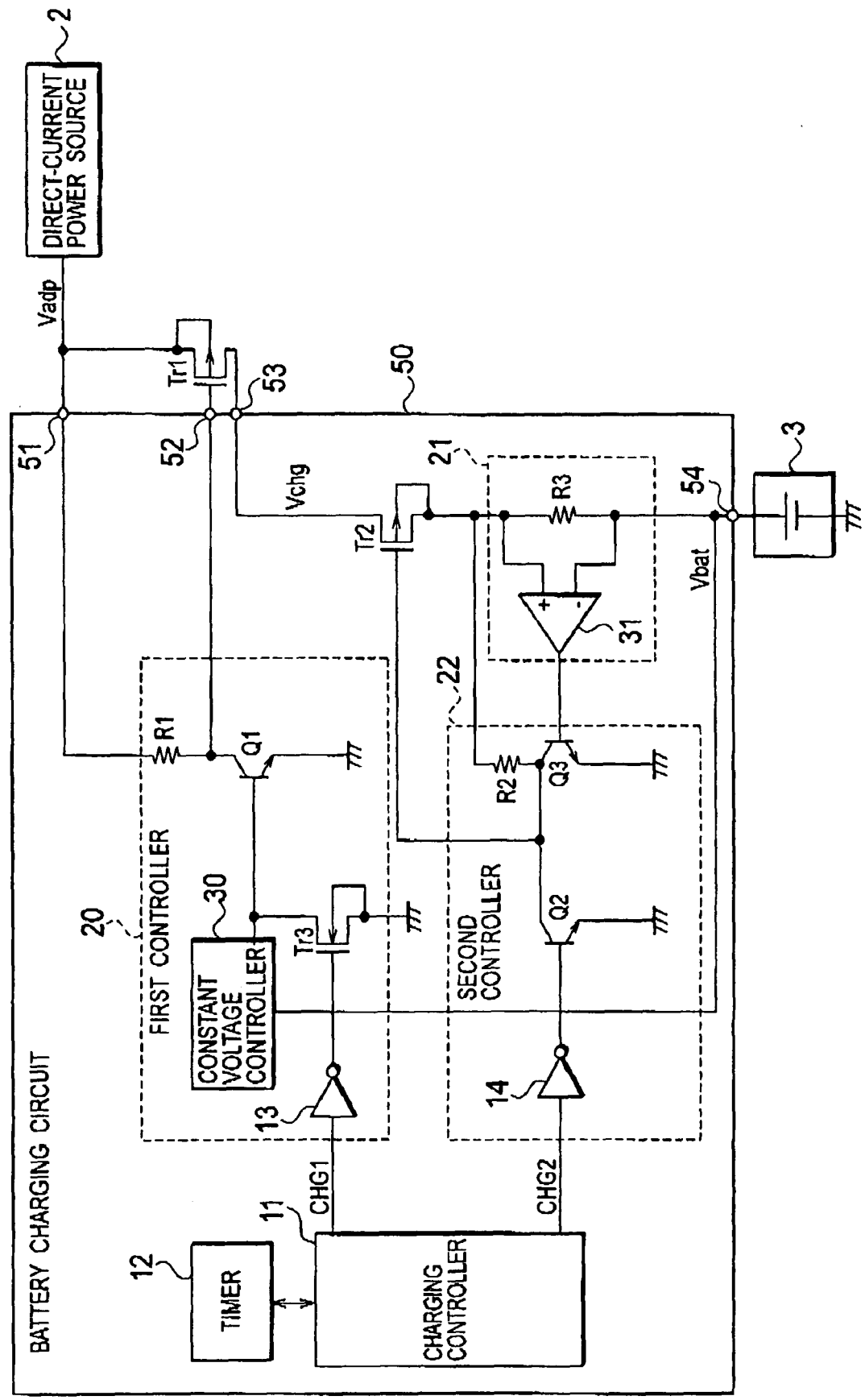
FIG. 5 is a circuit block diagram showing a configuration example of a semiconductor integrated circuit according to an embodiment of the present invention.

As shown in FIG. 5, the above-described backflow prevention transistor Tr2, the director detector 21, the first controller 20, the second controller 22, the charging controller 11 and the timer 12 are monolithically integrated on a semiconductor chip (not shown) to be formed as a semiconductor integrated circuit 50.

The semiconductor integrated circuit 50 includes a terminal 51 to which the direct-current voltage Vadp is applied; a terminal 52 to which an output voltage is applied from the first controller 20; a terminal 53 to which the charging voltage Vchg is applied; and a terminal 54 to which the battery voltage Vbat is applied.

Other Embodiments

It is to be understood that the present invention is not intended to be limited to the description and the drawings of the above-described embodiment. With the above disclosure, various alternative embodiments, examples and operational techniques will be obvious to those skilled in the art.

In the above-described embodiment, the example is described, in which the first controller 20 includes the inverter 13 and the nMOS transistor Tr3. However, instead of the nMOS transistor Tr3, a pMOS transistor may be used, and the inverter 13 may be omitted. Alternatively, instead of the nMOS transistor Tr3, an npn transistor may be used.

Moreover, another example is described, in which the second controller 22 includes the inverter 14 and the npn transistor Q2. However, instead of the npn transistor Q2, a pnp bipolar transistor may be used, and the inverter 14 may be omitted. Alternatively, instead of the npn transistor Q2, an nMOS transistor may be used.

Furthermore, still another example is described, in which the second controller 22 includes the npn transistor Q3 connected to the output of the comparator 31. However, instead of the npn transistor Q3, an nMOS transistor may be used.

As described above, it is to be understood that the present invention includes various types of embodiments and the like not described herein. Hence, the scope of the present invention is indicated only by the appended claims.

What is claimed is:

1. A battery charging circuit used by being connected to a direct-current power source, comprising:
    a control transistor disposed in a charging path between the direct-current power source and a battery, and configured to control a direct-current voltage from the direct-current power source, and to output controlled direct-current voltage as a charging voltage;
    a backflow prevention transistor disposed in the charging path, and serially connected to the control transistor, and configured to output the charging voltage to the battery, and to be turned off when an electric current flows backward from the battery to the direct-current power source;
    a charging controller configured to turn on the backflow prevention transistor when charging of the battery starts, and to turn on the control transistor after a fixed period of time elapses from a start of the charging; and
    a timer configured to measure a first time from a point in time at which the backflow prevention transistor is turned on;
    wherein the charging controller is configured to turn on the control transistor after the first time elapses from the point in time at which the backflow prevention transistor is turn on;
    the timer is configured to measure a second time from point in time at which the backflow prevention transistor is turned on, the second time being longer than the first time; and
    the charging controller is configured to release forcibly-turned-on state of the backflow prevention transistor after the second time elapses from the time point when the backflow prevention transistor is turned on.

2. A semiconductor integrated circuit, which is used by being connected to a direct-current power source, a battery, and a control transistor disposed in a charging path between the direct-current power source and the battery, the control transistor controlling a direct-current voltage obtained from the direct-current power source, and outputting controlled direct-current voltage as a charging voltage, the semiconductor integrated circuit comprising:
    a backflow prevention transistor disposed in the charging path, and serially connected to the control transistor, and configured to output the charging voltage to the battery, and to be turned off when an electric current flows backward from the battery to the direct-current power source;
    a charging controller configured to turn on the backflow prevention transistor when charging of the battery starts, and to turn on the control transistor after a fixed period of time elapses from a start of the charging; and
    a timer configured to measure a first time from a point in time at which the backflow prevention transistor is turned on, wherein
    the charging controller is configured to turn on the control transistor after the first time elapses from the point in time at which the backflow prevention transistor is turned on;
    the timer is configured to measure a second time from point in time at which the backflow prevention transistor is turned on, the second time being longer than the first time; and
    the charging controller is configured to release forcibly-turned-on state of the backflow prevention transistor after the second time elapses from the time point when the backflow prevention transistor is turned on.

\* \* \* \* \*